United States Patent [19]

Dietrich, Sr.

[11] 4,444,271

[45] Apr. 24, 1984

[54] TILLAGE APPARATUS WITH INDEPENDENT DEPTH ADJUSTMENT

[75] Inventor: William J. Dietrich, Sr., Congerville, Ill.

[73] Assignee: DMI, Inc., Goodfield, Ill.

[21] Appl. No.: 318,838

[22] Filed: Nov. 6, 1981

Related U.S. Application Data

[60] Continuation-in-part of Ser. No. 220,419, Dec. 29, 1980, which is a division of Ser. No. 934,585, Aug. 17, 1978, Pat. No. 4,245,706.

[51] Int. Cl.$^3$ ............................................. A01B 13/08
[52] U.S. Cl. .................................... 172/140; 172/468; 172/484; 172/166
[58] Field of Search ............... 172/140, 178, 484, 177, 172/178, 179, 180, 146, 148, 181, 771, 147, 149, 770, 145, 150, 454, 483, 497, 583, 166, 504, 197, 316, 78, 468, 469, 470, 471, 785

[56] References Cited

U.S. PATENT DOCUMENTS

| | | | |
|---|---|---|---|
| 1,557,109 | 10/1925 | Vandenberg | 172/603 |
| 1,944,275 | 1/1934 | Sandeen | 172/705 X |
| 2,593,028 | 4/1952 | Hendrick | 172/140 |
| 2,671,973 | 3/1954 | Bensel | 172/197 X |
| 2,701,509 | 2/1955 | Rolfes | 172/316 |
| 3,757,871 | 9/1973 | Maust | 172/178 |
| 4,243,104 | 1/1981 | Sipos | 172/148 |
| 4,245,706 | 1/1981 | Dietrich | 172/196 |
| 4,313,503 | 2/1982 | Good | 172/140 |
| 4,315,547 | 2/1982 | Rau | 172/146 |

OTHER PUBLICATIONS

Turbo-Tiger, Advertizing Brochure of DMI, Inc., Goodfield, IL.

Primary Examiner—Richard J. Johnson
Attorney, Agent, or Firm—Emrich, Lee, Brown & Hill

[57] ABSTRACT

An agricultural tillage implement adapted to be pulled by a vehicle comprises a main frame adapted to carry ground working tools. The main frame is supported on wheels rotatably mounted thereto. A sub-frame carrying ground working tools is mounted to the main frame by means of a lift mechanism. The lift mechanism includes a single horizontal rock shaft mounted to the main frame for rotation about its axis. A hydraulic cylinder rotates and holds the rock shaft at determined rotational displacements. Shaft arms affixed to the rock shaft are pivotally connected to the sub-frame. Connecting arms are rotatably connected to the main frame at one end and are rotatably connected to the sub-frame at another end. Rotation of the rock shaft moves the shaft arms, connecting arms, and sub-frame in a four-bar linkage motion to raise and lower the sub-frame while maintaining the sub-frame in a generally horizontal position for all working depths. Ground working tools carried on the sub-frame are adjusted as to depth independently of ground working tools carried on the main frame.

20 Claims, 3 Drawing Figures

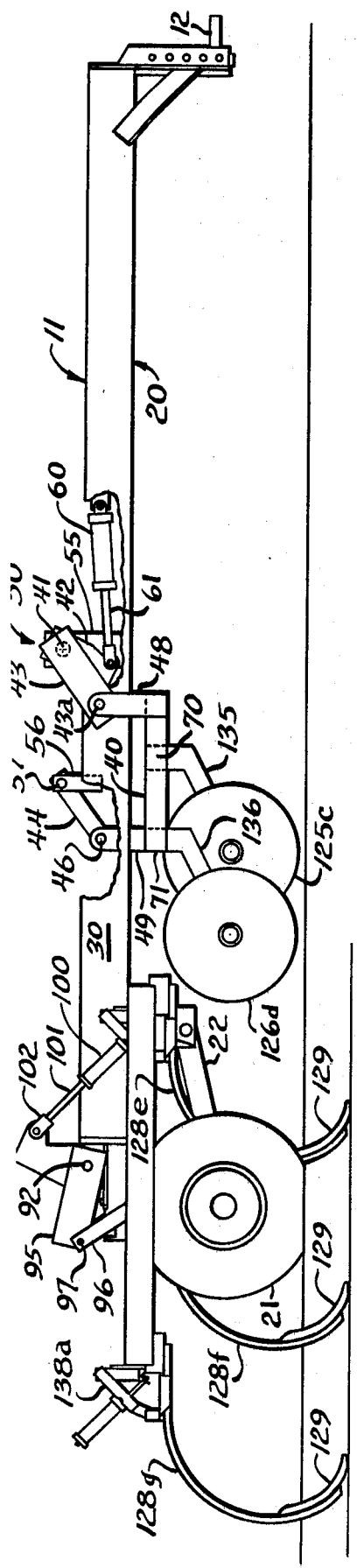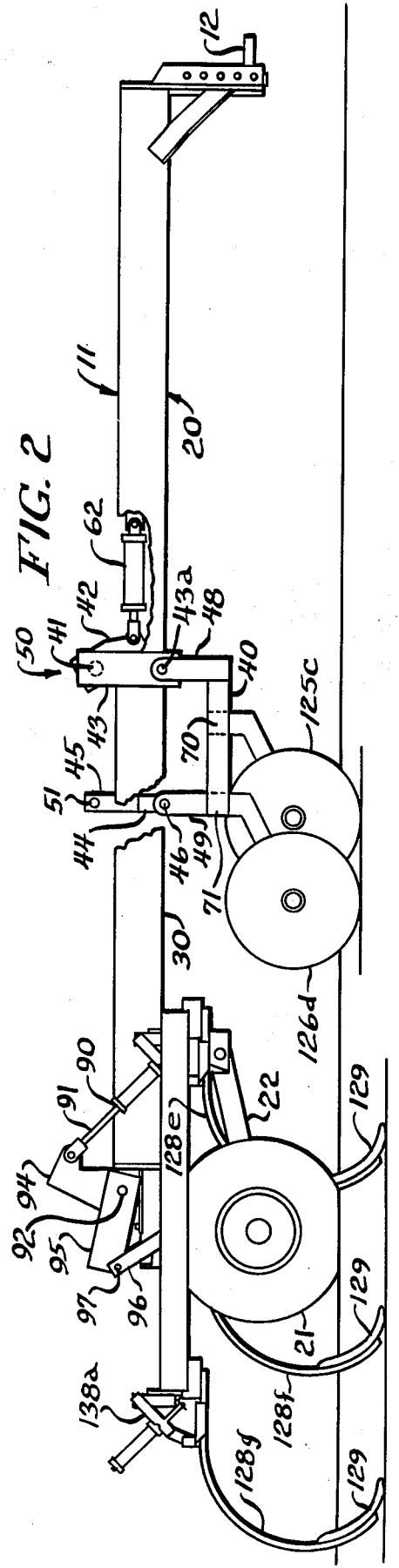

TILLAGE APPARATUS WITH INDEPENDENT DEPTH ADJUSTMENT

RELATED APPLICATION

This is a continuation-in-part application of application Ser. No. 220,419, filed Dec. 29, 1980, which is a divisional application of Ser. No. 934,585, filed on Aug. 17, 1978, now U.S. Pat. No. 4,245,706, issued Jan. 20, 1981.

BACKGROUND OF THE INVENTION

The present invention relates to an agricultural tillage apparatus; and more particularly, it relates to a tillage apparatus providing independent depth adjustment of ground working tools carried thereon.

Efficient farming requires a limited number of passes over the farm land in order to reduce man hours on the field and maximize the work done with a given amount of fuel. In order to combine various operations within one-pass over the field, differing types of ground working tools are mounted on the implement for simultaneous use as the implement travels over the field. For example, two operations, cutting and burying trash, can be performed simultaneously by mounting coulter disks, which cut trash, to the front of an implement followed by chisel plows, which bury trash, mounted to the rear. Ideally, a farm implement would be able to accommodate the physical differences in size and shape between the differing ground working tools to allow them to be used simultaneously on the same implement.

My earlier co-pending application for a One-Pass Complete Tillage System filed Dec. 29, 1980, Ser. No. 220,419, discloses an adjustment mechanism for independently setting the depth of ground-working tools mounted on an implement frame. The adjustment mechanism, disclosed in that application, includes an actuator arm pivotally connected to the rod end of a hydraulic cylinder. The other end of the actuator arm is attached to a first or forward rock shaft which is rotatably mounted to the main frame. A link is welded at one end to rotate with the forward rock shaft and its other end is pivotally connected to a sub-frame. A parallel linkage, also controlled by the actuator arm and shaft, extends rearwardly to operate a crank mounted to a second or rear rock shaft and rear links connected to lift the rear of the sub-frame. A turnbuckle is incorporated in the parallel linkage to make minor adjustments in the operating depth of the front and rear sets of the disk blades carried on the sub-frame and to provide adjustment for wear.

The invention disclosed in my co-pending application is capable of great vertical travel because the two rock shafts and connecting turnbuckle substantially eliminate problems of lock-up or jamming of the pivoting link means, by applying rotational forces symmetrically above and below the link means. Thus, the disclosed invention of my co-pending application is capable of rotation of 150 degrees or more. However, such a degree of vertical travel is not always necessary, and a simpler less expensive construction is desirable.

SUMMARY OF THE INVENTION

The present invention is directed to a tillage apparatus which permits independent depth adjustment for ground working tools mounted thereon. The present invention is simple in construction and is adaptable to a variety of ground working tool combinations such as coulter blades and chisel shanks, disk blades and cultivator sweeps, and cultivator sweeps and anydrous ammonia knives.

Briefly, the present invention includes an agricultural tillage implement, adapted to be pulled by a vehicle, comprising a main frame adapted to carry ground working tools. The main frame is carried upon wheels rotatably mounted thereto equipped with means for raising and lowering the main frame. A sub-frame, also adapted to carry ground working tools, is mounted to the main frame by means of a lift mechanism. The lift mechanism includes a rock shaft rotatably mounted to the main frame. A crank is secured to the rock shaft and extends to and is pivotally connected to one end of a hydraulic cylinder. The hydraulic cylinder rotates the rock shaft when the cylinder is actuated. Shaft arms are connected to the rock shaft for rotatation therewith at one end of each shaft arm. The opposite end of each shaft arm is rotatably mounted to the sub-frame. Connecting arms are roatably connected to the main frame at one end of each connecting arm, positioned distally yet substantially in a horizontal plane with the rock shaft. The other end of each connecting arm is rotatably connected to the sub-frame positioned distally yet substantially in a horizontal plane away from the shaft arms' connection to the sub-frame. As the rock shaft is rotated by the hydraulic cylinder the shaft arms raise or lower the sub-frame. The connecting arms rotate due to the movement of the sub-frame, maintaining the sub-frame in a horizontal position and stabilizing the sub-frame as ground working tools mounted thereon engage the ground surface. Such an apparatus allows for adjusting the depth of ground working tools carried on the sub-frame independently of ground working tools carried on the main frame.

Other features and advantages of the present invention will be apparent to persons skilled in the art from the following detailed description of the preferred embodiments, accompanied by the attached drawings wherein identical reference numerals will refer to like parts in the various views.

THE DRAWINGS

FIG. 1 is a side view, partially in cross-section, of a farm implement embodying features of the present invention.

FIG. 2 is a side view, partially in cross-section, of the farm implement of FIG. 1 wherein the forward ground working tools are in a lowered position relative to the main frame and independent of the position of the rear ground working tools.

DETAILED DESCRIPTION

Figure 3:
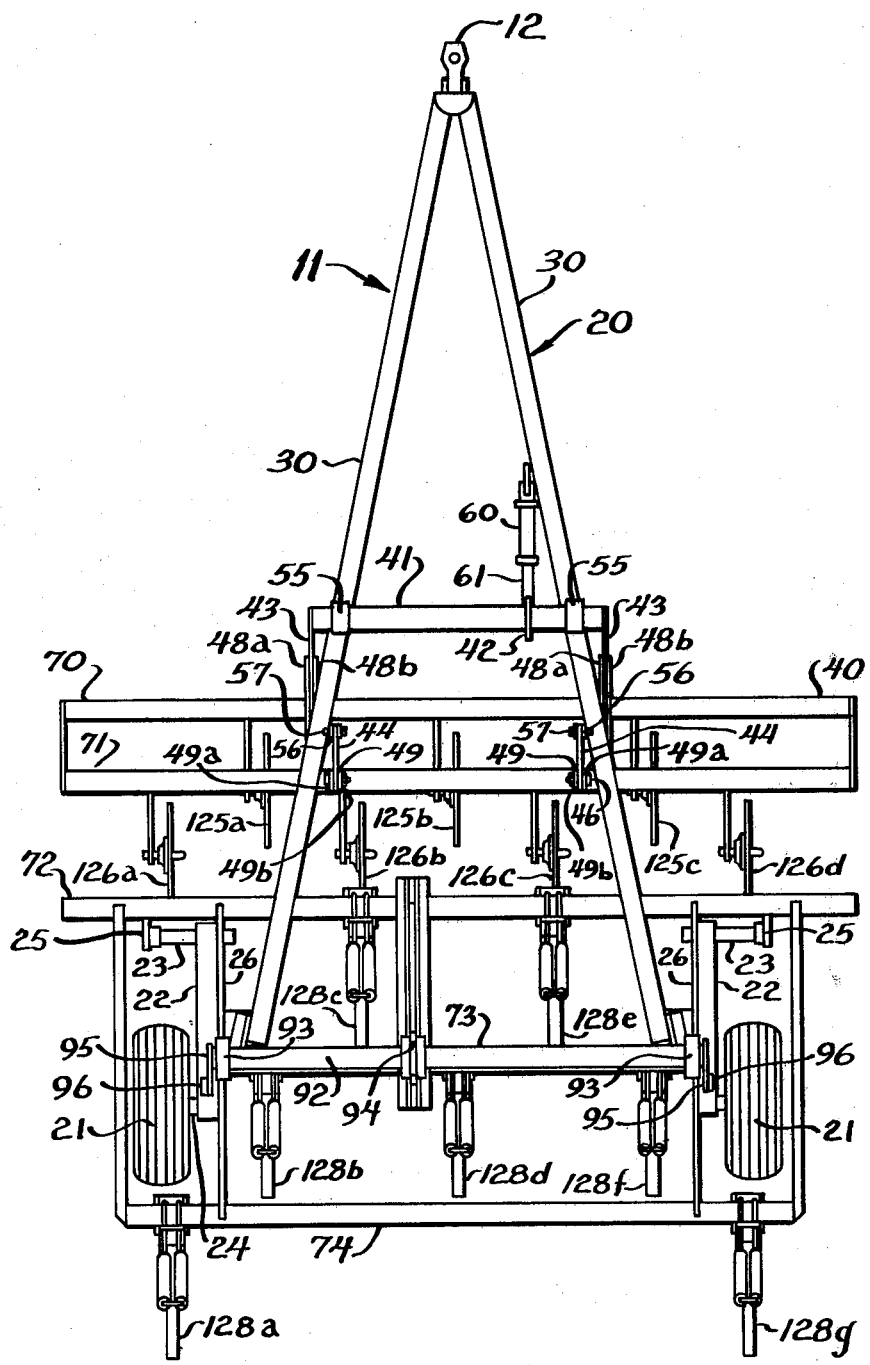
FIG. 3 is a plan view of the farm implement depicted in FIG. 1.

The agricultural tillage implement of the present invention, providing independent depth adjustment of ground working tools, is susceptible of embodiment in many different forms and in many different applications. The invention will be described in detail as an agricultural tillage implement with independent depth adjustment for coulter blades and chisel shanks with the understanding that the present disclosure is to be considered as an exemplification of the principles of the invention and is not intended to limit the invention to the embodiment illustrated. For example, the present invention would have application to a variety of ground working tool combinations such as disk blades and cultivator sweeps, or cultivator sweeps and anhydrous ammonia knives.

Referring first to FIG. 1, an agricultural tillage implement embodying the subject invention, generally designated by numeral 11, carries two types of ground working tools, coulter baldes, generally designed by numerals 125 and 126, and chisel shanks designated by numeral 128.

Referring now to FIG. 3, the main frame 20 has a general chevron shape having chevron members 30 extending outwardly and rearwardly from hitch 12 and laterally extending horizontal members 72 and 74. The forward mounted ground working tools, coulter discs 125 and 126, are mounted in two rows to laterally extending horizontal members 70 and 71 of sub-frame 40. Coulter blades in the first row are designated 125a-c and are secured to the sub-frame 40 by coulter blade securing arms 135; and coulter blades in the second row are designated 126a-d and are secured to sub-frame 40 by coulter blades securing arms 136. The coulter blades 125 and 126 are arranged in a mutually-spaced relationship along horizontal members 70 and 71. Chisel shanks 128a-g are mounted behind the coulter blades on horizontal members 72, 73 and 74, by conventional shock absorbing mechanisms 138, also in a mutually-spaced arrangement. The combination of coulter baldes and chisel shanks allows the implement to perform two operations in a single pass over the field promoting the efficient use of man-hours and conserving fuel. The coulter blades 125 and 126 cut waste vegetation commonly referred to as trash, such as cornstalks. The chisel shanks 128, following the coulter blades, are equipped with plow tips 129 which break up the soil and bury the trash.

Referring now to FIG. 1, the tillage implement 11 is provided with a lift mechanism 50, which allows for the adjustment of depth of the coulter blades 125 and 126 mounted to sub-frame 40 independenly of the chisel shanks 128 mounted to horizontal members 72, 73 and 74.

The lift mechanism 50 includes a rock shaft 41 rotatably mounted to the main frame 20 by means of pillow blocks 55. A crank lever 42 is secured to and extends downwardly from the rock shaft 41 at its proximal end and is connected at its distal end to a power means such as hydraulic cylinder 60. The inward and outward movement of the rod 61 of the hydraulic cylinder 60 will rotate the crank lever 42 and pivot the rock shaft 41. The crank arm 42 extends downward to provide a low profile and reduces rearward visual obstructions.

Left and right shaft arms 43 are rigidly attached to the ends of the rock shaft 41 toward their proximal ends and extend downwardly at their distal ends to the sub-frame 40. Bolts 43a rotatably secure the shaft arms 43 to two forward brackets 48 of the sub-frame 40. As can best be seen in FIG. 3, each forward bracket 48 includes a left hand 48a and a right half 48b to distribute forces exerted upon the individual brackets 48 and shaft arms 43 in a balanced manner. Forward brackets 48 extend forward and upwardly in an L-shaped configuration, the purpose of such shape will be discussed later.

Referring again to FIG. 1, the main frame 20 includes two vertical posts 56 extending upward from the chevron members 30 to which they are mounted by suitable means such as welding. Connecting arms 44 are rotatably secured to the vertical posts 56 by means of pivot bolts 57 extending through corresponding holes in the vertical posts 56 and the proximal ends of the connecting arms 44. The connecting arms 44 are rotatably mounted at their distal ends to rear brackets 49 of the sub-frame 40 by suitable means such as bolts 46. As can best be seen in FIG. 3, rear bracket 49, like forward bracket 48, includes a left half 49a and a right half 49b to distribute forces exerted on each rear bracket 49 and connecting arm 44 symmetrically.

As illustrated in FIG. 1, hydraulic cylinder 60, secured at one end to the frame 20, has a hydraulic cylinder rod 61 shown in an extended position forcing the crank lever 42 rearward. Shaft arms 43 connected to rock shaft 41 have been rotated clockwise forcing sub-frame 40 rearward and upward. As the sub-frame 40 is forced rearward and upward, connecting arms 44 toward the rear of the sub-frame 40 swing the sub-frame 40 in a motion parallel to the motion of the shaft arms 43.

The distance between the axes of rotation of the shaft arms 43 at the center of rock shaft 41 and pivot bolt 43a, substantially corresponds to the distance between the axes of rotation of the connecting arms 44 at pivot bolts 46 and 56; i.e., the effective length of the shaft arm 43 approximates the effective length of connecting arm 44. Likewise, the distance between the axis of rotation of the rock shaft 41 and the uppermost axis of rotation of the connecting arms 44 at bolts 57 substantially corresponds to the distance between the axes of rotation of the lower pivot points, at the shaft arms 43 and forward brackets 48 connections at bolts 43a and at connecting arms 44 and rear brackets 49 connections at bolts 46. All four axes of rotation roughly define a parallelogram when viewed from the side. Movements of shaft arms 43 will be substantially repeated by connecting arms 44 maintaining sub-frame 40 in a horizontal orientation relative to the main frame 20 in a four-bar linkage motion.

Referring now to FIG. 2, hydraulic cylinder rod 61 is withdrawn within the hydraulic cylinder 60, pulling crank arm 42 forward and rotating the rock shaft 41 counterclockwise. Rotation of the rock shaft 41 turns the shaft arms 43 in a counterclockwise manner until the sub-frame 40 is in a fully-descended position with the axis of rotation at bolts 43a of shaft arms' 43 connection to the sub-frame 40. The axes of rotation at bolts 47 of the connecting arms' 44 connections to the main frame 20 at the rear vertical posts 56 are directly above the axes of rotation at bolts 46 of the connecting arms' 44 connections to the sub-frame 40. Hydraulic cylinder 60 holds the crank arm 42 and the rock shaft 41 in a positive manner. A given rotation displacement of the rock shaft 41 determined by the extension of hydraulic cylinder 60 will produce a given depth of ground working tools carried on the sub-frame 40.

During use, pivot bolts 43a, 46 and 57 and the holes through which they extend become worn, causing such pivot connections to be loose. Wear of the rock shaft 41 due to its substantially greater size is not as great of a problem. Engagement of the ground working tools on the sub-frame 40 with the ground places a torque on the sub-frame 40 which tends to compress connecting arms 44 and extend shaft arms 43. After wear, if connecting arms 44 are lowered to a vertical position with the coulter blades 125 and 126 engaged in the ground surface, bolts 57 and 46 in the connecting arms will move into the worn areas shortening the effective lengths of the connecting arms 44 and rear brackets 49. Bolts 43a will also move into the worn areas due to torque on the sub-frame 40 tending to lengthen shaft arm 43. Thus, after wear the sub-frame 40 may become canted, upon engagement of ground working tools, out of a horizontal position. Eventually, the tilt of the sub-frame 40 can become so great as to limit the usefulness of the implement 11.

One aspect of the present invention substantially alleviates the problem of wear in the lift mechanism 50 by providing the rear of the sub-frame 40 with additional depth to increase the reach of the sub-frame in the area most affected by wear. Thus, the sub-frame 40 is provided initially with a downward slant towards the rear with the rear of sub-frame 40 held lower than the front. As the pivot areas of the lift mechanism 50 at bolts 46, 57 and 43a become worn, the sub-frame 40 will acquire a more horizontal orientation when the ground working tools are engaged in the ground surface. Still greater wear will eventually cause the sub-frame 40 to acquire an upward tilt toward the rear of the sub-frame 40. However, the lift mechanism 50 is capable of sustaining greater wear than if the sub-frame 40 had been positioned in a horizontal plane initially.

There are numerous ways in which to provide the rear of the sub-frame 40 with an increased reach. For example, the distance between the axis of rotation of the connections of the connecting arms 44 to the sub-frame 40 and to the main frame 20 at bolts 57 and 46 is greater than the distance from the axis of rotation of the rock shaft 41 to the axis of rotation of the connection of the shaft arms 43 to the sub-frame 40 at bolt 43a. The effective length of the connecting arms 44 is then greater than the effective length of the shaft arms 43. Similarly, the effective length of the rear bracket 49 may be increased by placing the holes for receiving bolts 46 upward in rear bracket 49.

Alternatively, the lift mechanism 50 may be canted or tilted downward towards the rear of the sub-frame 40. For example, the holes for receiving bolts 57 in vertical posts 56 may be positioned rearward of holes for bolts 46 in rear bracket 49 and lower than the rock shaft 41. The parallelogram defined by the axes of rotation at the rock shaft 41, bolts 46, 43a and 57 is thus shifted downward towards the rear lowering the aft portion of sub-frame 40 lower than the forward portion. Further, as can be seen in FIG. 1, moving the holes for bolts 57 rearwardly tends to lower the sub-frame when the sub-frame is in a partially raised position. With reference to FIG. 2, lowering the holes for bolts 57 primarily accommodates wear in pivot areas when the connecting arms 44 are in a vertical orientation; whereas rearward movement of the holes for bolts 57 additionally accommodates wear in the pivot areas when the sub-frame 40 is in a raised position.

Similarly, the hole for receiving bolts 46 in rear brackets 49 can be moved forward and upward on rear brackets 49 to achieve the same result. It will readily be noticed that if the holes for bolts 46 are moved upward on rear brackets 49 the effective length of the connecting arms 44 and rear brackets 49 is increased relative to the effective length of shaft arms 43 and forward brackets 48. The sub-frame 40 is then carried lower in the back when the connecting arms 44 are in a vertical position as shown in FIG. 1. Forward displacement of the holes receiving bolts 46 in rear brackets 49 accommodates wear in the pivot areas when the sub-frame 40 is in a raised or partially raised position as shown in FIG. 2.

Greater stability is obtained in the sub-frame 40 as the distance between the shaft arms 43 and connecting arms 44 increases. Thus, forward brackets 48 projects forward maximizing the distance between the shaft arms 42 and connecting arms 44. Forward and rear brackets 48 and 49 project upward to allow the sub-frame to be pulled up to the chevron members 30 when the shaft arms 43 and connecting arms 44 are in a substantially horizontal position. The upwardly projecting forward and rear brackets 48 and 49 allow the shaft arms to be kept reasonably short and do not require mounting the rock shaft 41 lower on the frame 20. It will be noted that different shaped sub-frames 40 may be readily substituted on a given lift mechanism 50. For example, in order to accommodate different ground working tools the implement 11 may be fitted with an alternative sub-frame 40 in which the distance between cross members 70 and 71 is increased or decreased and the forward projection of the forward bracket 48 correspondingly altered.

Forward and rear brackets 48 and 49 extend upwardly a distance equal to the thickness of the chevron members 30 such that the pivot connections on the brackets 48 and 49 at bolts 46 and 43a are substantially horizontal with the rock shaft 41 and the pivots at bolts 56 at the connection of the connecting arms 44 and vertical posts 56 when the sub-frame 40 is completely raised against chevron members 30. The upward projecting brackets 48 and 49 allow the shaft arms 43 and connecting arms 44 a near 90° arc of movement.

However, the torque forces on the sub-frame 40 would probably not allow more than a 75° rotation from the vertical shown in FIG. 1. The leverage causing connecting arms 44 to shift over center, above the axis of rotation at bolts 57, would become almost infinite as the connecting arms 44 approached a horizontal orientation. If the connecting arms 44 shift over center, a pulling force exerted upon the crank arm 43 by cylinder 60, pulling sub-frame 40 forward, would tend to rotate the connecting arms 44 in a clockwise direction, thereby jamming or locking up the lift mechanism 50.

The present invention includes a stop means to prevent the connecting arms 44 from rotating over center. As the connecting arms 44 approach a horizontal position at the top of their arc of movement, cross member 71 of the sub-frame 40 abuts chevron members 30 of the main frame 20 preventing further upward movement of the connecting arms 44. Of course other stop means may readily be substituted by affixing suitable abutment surfaces to the connecting arms 44 or the like.

The lift means 50, connecting arms 44 and shaft arm 44, arc upward towards the rear of the implement 11 and downward towards the front of the implement 11. When the ground working tools, such as coulter disks 125 and 126, are engaged with the ground surface the forward draft of the implement 11 will help raise the sub-frame 40 when the operator raises the sub-frame 40 while the implement 11 is in motion. The forward draft of the implement 11 is offset when the sub-frame 40 is lowered while the implement 11 is in motion by the weight of the sub-frame 40 and ground working tools.

It will be readily seen that the movement of the rod 61 of the hydraulic cylinder 60 controls the depth of the coulter disks 125 and 126. Hoses leading to the hydraulic cylinder 60 have been deleted for clarity. Preferably, the controls for actuating the hydraulic cylinder 60 are located next to the operator's position on the vehicle to be used for towing the tillage implement. Thus, the depth of the coulter blades 125 and 126 may be adjusted while the tillage implement 11 is in motion.

Referring now to FIG. 3, chisel shanks 128 are attached to lateral horizontal members 72, 73 and 74. The lateral horizontal member 72, 73 and 74 are rigidly affixed to the chevron member 30 by suitable means such as welding. Preferably, the main frame 20 is supported upon wheels 21 provided with means for raising and lowering the same. As can best be seen in FIG. 3, wheels 21 are rotatably mounted upon axles 24 secured to wheel beams 22. Opposite the axles 24 on the wheel beams 22 are shafts 23 securing the wheel beams 22 to brackets 25 and horizontal side members 26. Side members 26 extend parallel to the normal direction of movement from cross-members 72 and 74.

Referring now to FIGS. 1 and 2, links 96 extend upwardly from the wheel beams 22 where they are pivotally mounted. Links 96 are pivotally mounted at link pivots 97 to wheel shaft arms 95. Wheel shaft arms 95 are affixed to the ends of wheel rock shaft 92, best seen in FIG. 3. Wheel rock shaft 92 is rotatably secured to frame 20 by means of pillow blocks 93 affixed to side members 26.

Referring again to FIGS. 1 and 2, wheel crank arm 94 is secured to wheel rock shaft 92 and extends upward. Wheel crank arm 94, like crank arm 42, has an indentation to accommodate rotation of an end bracket 102 of cylinder rod arm 101 of hydraulic cylinder 100. Hydraulic cylinder 100 is mounted to cross-member 72 of frame 20. Hoses leading to hydraulic cylinder 100 have been deleted for clarity. Extending or withdrawing cylinder rod arm 101 will cause wheel crank arm 94 to rotate rock shaft 92 and wheel shaft arms 95. Rotation of the wheel shaft arms 95 counterclockwise force links 96 downward rotating wheel beams 22 counterclockwise lifting frame 20 upward on wheels 21.

Preferably, the controls to actuate cylinder 100 are mounted in close proximity to the operator's position on the vehicle to be used to pull tillage implement 11. Thus, frame 20 can be raised and lowered while the tillage implement 11 is in motion adjusting the depth of the chisel shanks 128 mounted to the frame 20. Simultaneously, the operator can adjust the depth of the ground working tools mounted to the sub-frame 40, such as coulter blades 125 and 126, to accommodate the change in position of the main frame 20. The depth of the forward ground working tools mounted to sub-frame 40 can be adjusted by setting the extension of cylinder arm 61 of hydraulic cylinder 60.

In operation, the forward ground working tools mounted on the sub-frame 40 are lowered by withdrawing the cylinder arm 61 of hydraulic cylinder 60 to rotate the crank arm 42, rock shaft 41 and shaft arm 43 in a counterclockwise direction. Sub-frame 40, affixed to shaft arm 43 by means of forward bracket 48 descends downwardly along the arc of movement of shaft arm 43. The rear of the sub-frame 40 is supported by the connecting arm 44 mounted to a vertical post 56 to the main frame 20. As the sub-frame 40 is pulled forward and downward, the rear of the sub-frame 40 swings downward along the arc of movement of connecting arm 44 maintaining the sub-frame 40 in a substantially horizontal relationship with the ground and frame 20. The forward ground working tools are raised by extending cylinder arm 61 of hydraulic cylinder 60 which rotates crank arm 42, rock shaft 41 and shaft arm 43 in a clockwise direction. The depth of the rear chisel shank can be adjusted by raising and lowering the main frame 20 on wheels 21 by actuating wheel hydraulic cylinder 100.

Thus, the present invention provides a simple mechanism in which sets of ground working tools carried on a tillage implement can be independently adjusted as to working depth. The invention requires only one rock shaft 41 for the sub-frame lift mechanism 50 and eliminates a linkage extending parallel to the sub-frame 40 such as a turnbuckle. Thus, the present invention is less expensive to manufacture, yet retains the versatility of an implement capable of independent depth adjustment.

Having thus disclosed preferred embodiments of the invention, persons skilled in the art will be able to modify certain of the structure which has been disclosed and to substitute equivalent elements for those described while continuing to practice the principal of the invention; and it is, therefore, intended that all such modification and substitutions be covered as they are embraced within the spirit and scope of the appended claims.

I claim:

1. An agricultural tillage implement adapted to be pulled by a vehicle comprising a main frame adapted to carry first ground working tools; wheels rotatably mounted to said main frame for support of said frame; means for raising and lowering said main frame upon said wheels; a sub-frame carrying second ground working tools; lift means for mounting said sub-frame to said main frame including a rock shaft mounted to said main frame for rotation about a horizontal axis; power means for rotating said rock shaft; at least one shaft arm having a proximal end fixed to said rock shaft and a distal end rotatably mounted to said sub-frame; connecting arm means pivotally connected to said main frame at one end and pivotally connected to said sub-frame at the other end and extending generally parallel to said shaft arm; characterized in that said lift means includes only one rock shaft, said rock shaft being rotatable to move said shaft arm, sub-frame and connecting arm means in a four-bar linkage motion thereby raising and lowering said sub-frame relative to said main frame, maintaining said sub-frame in a generally horizontal position for all working depths to allow the adjustment of the working depth of ground working tools carried on said sub-frame relative to the working depth of ground working tools carried on said main frame.

2. The apparatus of claim 1 wherein said power means for rotating said rock shaft includes a crank lever rigidly secured to said rock shaft to rotate therewith, and a hydraulic cylinder having one end connected to said main frame and the other end connected to said crank lever to rotate said crank lever and said rock shaft when said cylinder is actuated and holding said rock shaft in a selected rotational disposition.

3. The apparatus of claim 1 wherein said means for raising and lowering said main frame includes a second power means for raising and lowering said main frame upon said wheels to adjust the working depth of first tools mounted on said main frame.

4. The apparatus of claim 2 wherein said power means is actuable from the operator's position of said vehicle while said vehile is in motion.

5. The apparatus of claim 1 wherein the rear of said sub-frame extends lower than the front of said sub-frame to compensate for wear of rotational surfaces of said lift means.

6. The apparatus of claim 1 wherein said lift means is slanted downward towards the rear of said sub-frame to carry said rear of said sub-frame lower than the front of said sub-frame to compensate for wear of rotational surfaces of said lift means.

7. The apparatus of claim 1 wherein said distance between the axis of rotation of the connections of said lift means to said sub-frame and the axis of rotation of said lift means to said main frame towards the rear of said sub-frame is greater than the distance from the axis of rotation of the connections of said lift means to said main frame and the axis of rotation of the connections of said lift means to said sub-frame towards the front of said sub-frame to compensate for wear of rotational surfaces of said lift mechanism.

8. The apparatus of claim 1 wherein said lift means is mounted lower on said main frame towards the rear of said sub-frame than said connection of said lift means to said main frame towards the front of said sub-frame and said connection of said lift means to said main frame towards the rear of said sub-frame is mounted rearward of said connection of said lift means to said sub-frame towards the rear of said sub-frame to compensate for wear of rotational surfaces of said lift means.

9. The apparatus of claim 1 wherein said lift means is mounted towards the rear of said sub-frame at a position forward of the connection of said lift means to said main frame and above the connection of said lift means to said sub-frame towards the front of said sub-frame, to compensate for wear of rotational surfaces.

10. The apparatus of claim 1 wherein the sub-frame further comprises brackets extending from said sub-frame horizontally, and rotatably mounted to said lift means to increase the stability of said sub-frame.

11. The apparatus of claim 1 wherein said sub-frame further comprises brackets upwardly projecting and rotatably mounted to said lift means allowing said connecting arm means and shaft arm a greater arc of movement.

12. The apparatus of claim 1 wherein said sub-frame further comprises brackets extending from said sub-frame horizontally and having a projecting portion extending upward, said upward projecting portion of said bracket rotatably mounted to said lift means to allow said connecting arm means and shaft arm a greater arc of movement and increasing the stability of said sub-frame.

13. The apparatus of claim 1 further comprising stop means to prevent further upward movement of said lift means.

14. The apparatus of claim 13 wherein said stop means includes abutment surfaces on said main frame which engage said sub-frame to prevent further upward movement of said lift means and said sub-frame.

15. The apparatus of claim 1 wherein the lift means arc upwards towards the rear of said sub-frame and downward toward the front of said sub-frame to allow the forward draft of said implement to facilitate raising said sub-frame while said implement is in motion and to allow the weight of said sub-frame facilitate lowering said sub-frame against said forward draft.

16. An agricultural tillage implement adapted to be pulled by a vehicle comprising: a main frame adapted to carry first ground working tools; wheels rotatably mounted to said main frame for support of said main frame; means for raising and lowering said main frame upon said wheels; a sub-frame carrying second ground working tools; lift means for mounting said sub-frame to said main frame including only one rock shaft rotatably mounted to said main frame; an hydraulic cylinder coupled to said rock shaft for rotating said rock shaft about its axis for holding said rock shaft in a selected rotational disposition; at least one shaft arm rigidly mounted to said rock shaft and extending radially thereof; connecting arm means pivotally connected to said main frame at one end and pivotally connected to said sub-frame at said other end remote from said shaft arm and extending substantially parallel thereto to form a four-bar linkage; and limit means for limiting the upward motion of said sub-frame relative to said main frame; said rock shaft being rotatable to move shaft arm, sub-frame, and connecting arm means in a four-bar linkage motion thereby raising and lowering said sub-frame relative to said main frame maintaining said sub-frame and its pivot connections in a generally horizontal position for all working depths, to allow the adjustment of the working depth of ground working tools carried on said sub-frame relative to the working depth of ground working tools carried on said main frame.

17. The apparatus of claim 16 further comprising a crank arm extending below and affixed to said rock shaft and secured to one end of said hydraulic cylinder, said downwardly extending crank arm providing said farm implement with a low profile to eliminate rear visual obstructions.

18. The implement of claims 1 or 16 wherein said subframe includes a forward bar for mounting some of said second ground working tools in first position and a rear bar for mounting other of said second ground working tools in positions rearward of said first positions.

19. The apparatus of claim 18 wherein said subframe is generally rectangular in plan view whereby said forward and rear mounting bars are parallel to each other and transverse of the direction of travel of said implement.

20. The apparatus of claim 19 further characterized in that the respective pivotal connections of said sub-frame to said arm of said rock shaft and to said connecting arm means are displaced from one another in the fore-and-aft direction of said implement.

* * * * *